(12) United States Patent
Yeh (10) Patent No.: US 12,222,046 B2
(45) Date of Patent: Feb. 11, 2025

(54) FAUCET APPARATUS (71) Applicant: Ta-Yu Yeh, Changhua (TW)

(72) Inventor: Ta-Yu Yeh, Changhua (TW)

( * ) Notice: Subject to any disclaimer, the term of this patent is extended or adjusted under 35 U.S.C. 154(b) by 144 days.

(21) Appl. No.: 18/123,309

(22) Filed: Mar. 19, 2023

(65) Prior Publication Data

US 2024/0309968 A1 Sep. 19, 2024

(51) Int. Cl.
*F16K 31/60* (2006.01)
*E03C 1/04* (2006.01)

(52) U.S. Cl.
CPC .......... *F16K 31/605* (2013.01); *E03C 1/0412* (2013.01)

(58) Field of Classification Search
CPC .............................. F16K 31/605; E03C 1/0412
See application file for complete search history.

(56) References Cited

U.S. PATENT DOCUMENTS

| 7,357,154 B1 * | 4/2008 | Chen ................... F16K 11/0787 |
| | | 251/297 |
| 8,607,662 B2 * | 12/2013 | Huang .................... F16K 31/60 |
| | | 137/315.15 |
| 9,328,489 B2 * | 5/2016 | Prabhakar ............... F16K 21/04 |

* cited by examiner

Primary Examiner — Christine J Skubinna
(74) Attorney, Agent, or Firm — Ying-Ting Chen; Law Office of Michael Chen (57) ABSTRACT A faucet apparatus may include a faucet, a connecting piece, a locating member, and a handle. The faucet has a valve chamber formed therein, and a control valve is installed in the valve chamber, and the control valve comprises a valve rod protruding out from the valve chamber. The connecting piece is concaved to form a housing on the end thereof, and the other end of the connecting piece comprises a neck portion to connect to a locating head. A plurality of protruding portions are formed on the outer periphery of the connecting piece, and each of the protruding portions comprises a screw hole thereon to communicate with the housing. The connecting piece is connected to the valve rod through the housing, and a plurality of screws are configured to respectively screw into the screw holes to abut against the valve rod.

8 Claims, 8 Drawing Sheets

FAUCET APPARATUS

FIELD OF THE INVENTION

The present invention relates to a faucet apparatus and more particularly to a faucet apparatus having a structure for placing a handle on the faucet.

BACKGROUND OF THE INVENTION

Figure 8:
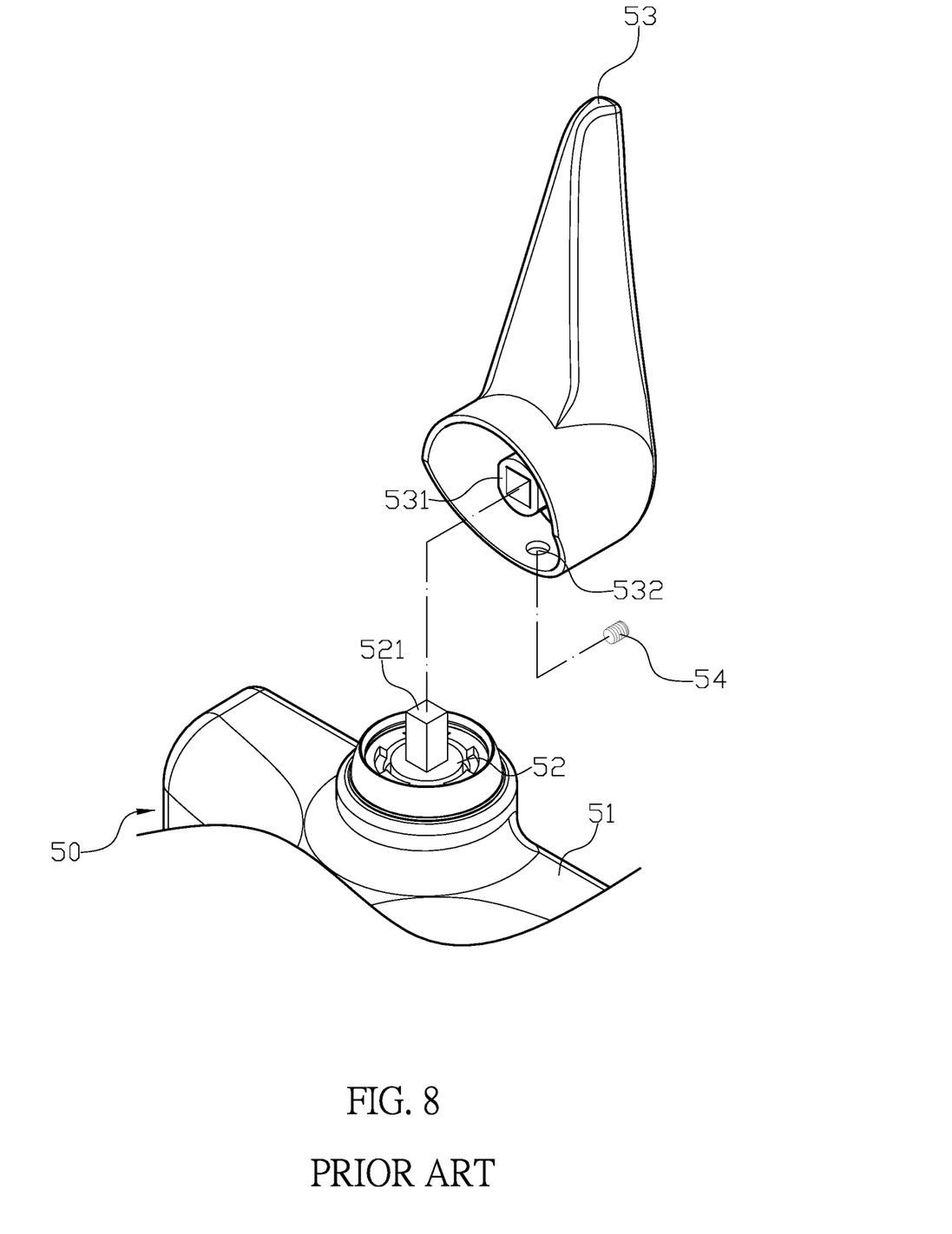
FIG. 8 is a prior art.

Referring to FIG. 8, the conventional faucet (50) comprises a main body (51), and a control valve (52) is installed in a valve chamber of the main body (51). The control valve (52) has a valve rod (521) protruding out from the valve chamber, and a handle (53) is connected to the valve rod (521) so that the faucet (50) can be operated by the handle (53) to complete the control of water flow opening and closing, and to change the mixing ratio of hot and cold water and the flow rate. Moreover, the handle (53) comprises a connecting tube (531) formed therein, and a through hole (532) penetrating through a side of the handle (53). The connecting tube (531) is adapted to top-down cover the valve rod (521), and a screw (54) pass through the through hole (532) to screw the connecting tube (531) with the valve rod (521), so that the handle (53) can be installed on the faucet (50) through the screw (54).

However, the conventional faucet apparatus has following disadvantages: (i) the inner tube of the connecting tube (531) needs to be made of the same shape or size as the valve rod (521) to be installed smoothly, which is inconvenient for user; (ii) after the screw (54) is placed from the through hole (532), it is difficult to align and lock the screw (54) due to the narrow internal space of the handle (53), which is time-consuming for assembly; and (iii) it is unattractive appearance when the faucet (50) having the through hole (532) exposed, and as a cover is used, the outlook of faucet (50) is lack of consistence. Therefore, there remains a need for a new and improved design for a faucet apparatus to overcome the problems presented above.

SUMMARY OF THE INVENTION

The present invention provides a faucet, a connecting piece, a locating member, and a handle. The faucet has a valve chamber formed therein, and a control valve is installed in the valve chamber, and the control valve comprises a valve rod protruding out from the valve chamber. The connecting piece is concaved to form a housing on the end thereof, and the diameter of the housing is larger than the valve rod, and the other end of the connecting piece comprises a neck portion to connect to a locating head, and the diameter of the locating head is gradually larger from the neck portion to the end away from the neck portion. The difference in the diameter between the locating head and the neck portion is utilized to connect the locating member thereon, and a plurality of protruding portions are formed on the outer periphery of the connecting piece, and each of the protruding portions comprises a screw hole thereon to communicate with the housing. The connecting piece is connected to the valve rod through the housing, and a plurality of screws are configured to respectively screw into the screw holes to abut against the valve rod, so that the connecting piece and the valve rod are firmly connected through the locking force of the screws. The locating member has a disk body, and a plurality of claws are formed on the outer periphery of one end of the disk body. Each of the claws comprises an inner claw portion and an outer claw portion at the end of the claw far from the disk body, and the claws are located separately to enable the claws to have elasticity of actively returning after external expansion. The locating member is disposed on the locating head by the elasticity thereof, and the inner claw portions are adapted to clasp on the locating head. The handle comprises a first edge and a second edge, and the first edge is formed inside the second edge, and an opening is formed at the end of the first edge, and the inner wall of the first edge has an engaging groove located adjacent to the opening. The second edge comprises a plurality of notches, and the number and the positions of the notches are formed corresponding to the protruding portions. The notches are configured to receive and engage with the protruding portions, and the handle is adapted to cover and connect to the outer side of the connecting piece. The locating member disposed on the locating head is pressed into the interior space of the first edge from the opening, and the outer claw portions are engaged with the engaging groove, so that the handle is firmed installed on the faucet. The handle is connected to the valve rod through the locating member and the connecting piece, and the faucet is configured to be operated by the handle to complete the control of water flow opening and closing, and to change the mixing ratio of hot and cold water and the flow rate.

Comparing with conventional faucet apparatus, the present invention is advantageous because: (i) the housing is disposed on the valve rod, and the screws are screwed to abut against the valve rod, so that the handle can be installed without limitation to the shape or size of the valve rod; (ii) the screws are screwed in an open space, which reduces the difficulty of installation and saves the labor and time; and (iii) there is no need to reserve through holes on the handle for the screws, which is better-looking and attractive for consumer.

DETAILED DESCRIPTION OF THE INVENTION

The detailed description set forth below is intended as a description of the presently exemplary device provided in accordance with aspects of the present invention and is not intended to represent the only forms in which the present invention may be prepared or utilized. It is to be understood, rather, that the same or equivalent functions and components may be accomplished by different embodiments that are also intended to be encompassed within the spirit and scope of the invention.

Unless defined otherwise, all technical and scientific terms used herein have the same meaning as commonly understood to one of ordinary skill in the art to which this invention belongs. Although any methods, devices and materials similar or equivalent to those described can be used in the practice or testing of the invention, the exemplary methods, devices and materials are now described.

All publications mentioned are incorporated by reference for the purpose of describing and disclosing, for example, the designs and methodologies that are described in the publications that might be used in connection with the presently described invention. The publications listed or discussed above, below and throughout the text are provided solely for their disclosure prior to the filing date of the present application. Nothing herein is to be construed as an admission that the inventors are not entitled to antedate such disclosure by virtue of prior invention.

In order to further understand the goal, characteristics and effect of the present invention, a number of embodiments along with the drawings are illustrated as following:

Referring to FIGS. 1 to 5, the present invention provides a faucet apparatus comprising a faucet (10), a connecting piece (20), a locating member (30), and a handle (40). The faucet (10) has a valve chamber (11) formed therein, and a control valve (not shown in figs.) is installed in the valve chamber (11), and the control valve comprises a valve rod (12) protruding out from the valve chamber (11). The connecting piece (20) is concaved to form a housing (201) on the end thereof, and the diameter of the housing (201) is larger than the valve rod (12), and the other end of the connecting piece (20) comprises a neck portion (202) to connect to a locating head (203), and the diameter of the locating head (203) is gradually larger from the neck portion (202) to the end away from the neck portion (202). The difference in the diameter between the locating head (203) and the neck portion (202) is utilized to connect the locating member (30) thereon, and a plurality of protruding portions (204) are formed on the outer periphery of the connecting piece (20), and each of the protruding portions (204) comprises a screw hole (205) thereon to communicate with the housing (201). The connecting piece (20) is connected to the valve rod (12) through the housing (201), and a plurality of screws (21) are configured to respectively screw into the screw holes (205) to abut against the valve rod (12), so that the connecting piece (20) and the valve rod (12) are firmly connected through the locking force of the screws (21). The locating member (30) has a disk body (31), and a plurality of claws (32) are formed on the outer periphery of one end of the disk body (31). Each of the claws (32) comprises an inner claw portion (321) and an outer claw portion (322) at the end of the claw (32) far from the disk body (31), and the claws (32) are located separately to enable the claws (32) to have elasticity of actively returning after external expansion. The locating member (30) is disposed on the locating head (203) by the elasticity thereof, and the inner claw portions (321) are adapted to clasp on the locating head (203). The handle (40) comprises a first edge (41) and a second edge (42), and the first edge (41) is formed inside the second edge (42), and an opening (411) is formed at the end of the first edge (41), and the inner wall of the first edge (41) has an engaging groove (412) located adjacent to the opening (411). The second edge (42) comprises a plurality of notches (421), and the number and the positions of the notches (421) are formed corresponding to the protruding portions (204).

The notches (421) are configured to receive and engage with the protruding portions (204), and the handle (40) is adapted to cover and connect to the outer side of the connecting piece (20). The locating member (30) disposed on the locating head (203) is pressed into the interior space of the first edge (41) from the opening (411), and the outer claw portions (322) are engaged with the engaging groove (412), so that the handle (40) is firmed installed on the faucet (10). Furthermore, the handle (40) is connected to the valve rod (12) through the locating member (30) and the connecting piece (20), and the faucet (10) is configured to be operated by the handle (40) to complete the control of water flow opening and closing, and to change the mixing ratio of hot and cold water and the flow rate.

In one embodiment, the faucet (10) is a wall mounted faucet (as shown in FIGS. 1 to 4).

Figure 7:
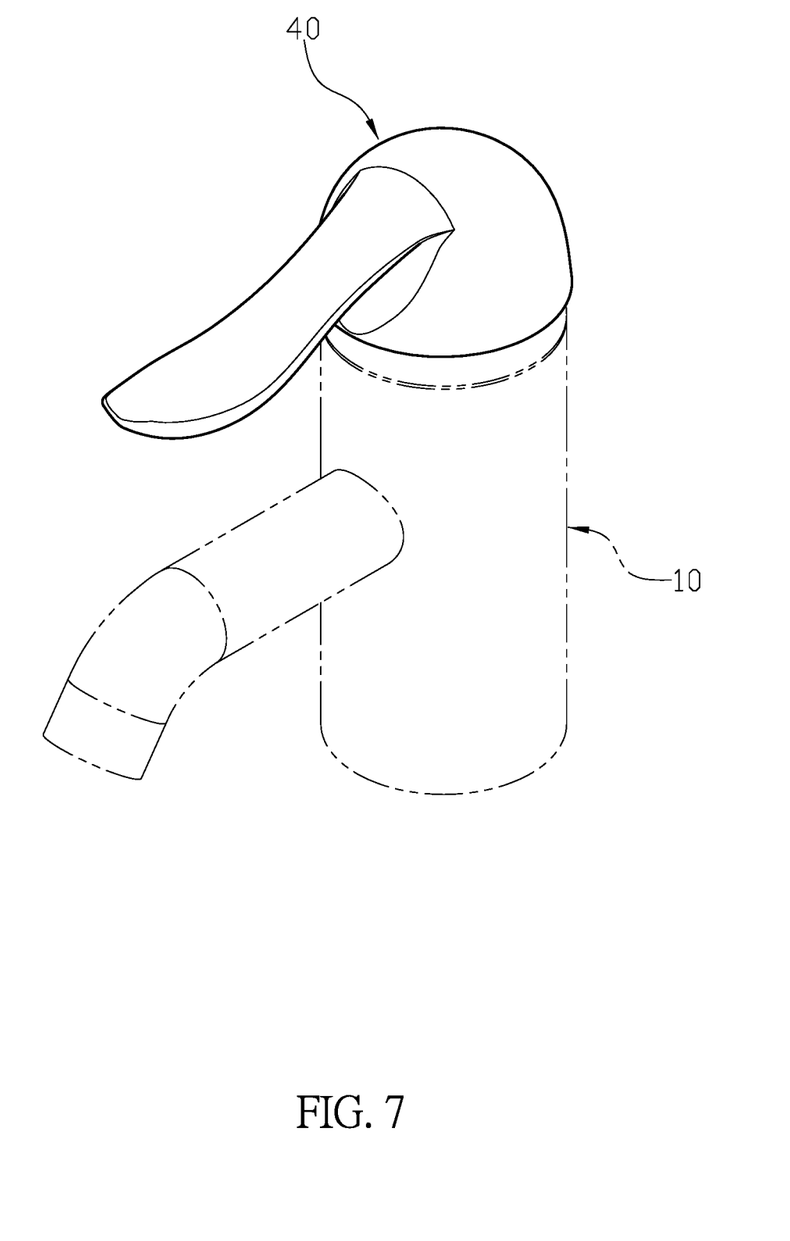
FIG. 7 is a schematic of another embodiment of the faucet apparatus in the present invention.

In another embodiment, the faucet (10) is a desk mounted faucet mounted on a washbasin or a kitchen counter (as shown in FIG. 7).

In still another embodiment, the locating head (203) is formed in spherical shape.

In a further embodiment, the connecting piece (20) has three protruding portions (204) thereon.

In still a further embodiment, the connecting piece (20) comprises three protruding portions (204) thereon, and one protruding portion (204) vertically protrudes from the top of the connecting piece (20), and the other two protruding portions (204) respectively protrude from two lateral sides of the connecting piece (20) and are extended slope-down.

In an advantageous embodiment, the outer claw portion (322) is formed in hook shape so that the outer claw portion (322) is difficult to disengage from the engaging groove (412) after completing the clasp.

In a preferred embodiment, the opening (411) of the first edge (41) is arranged in the shape of an outward expanding bevel so that the locating member (30) is more easily forced into the first edge (41) through the opening (411).

Figure 1:
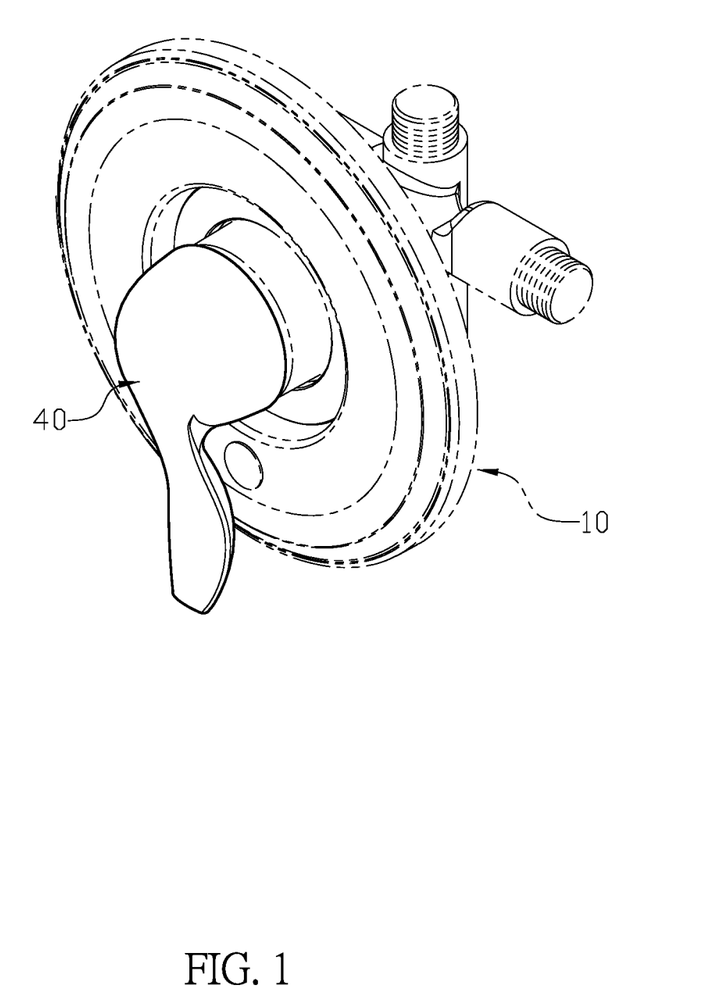
FIG. 1 is a three-dimensional assembly view of a faucet apparatus of the present invention.
Figure 2:
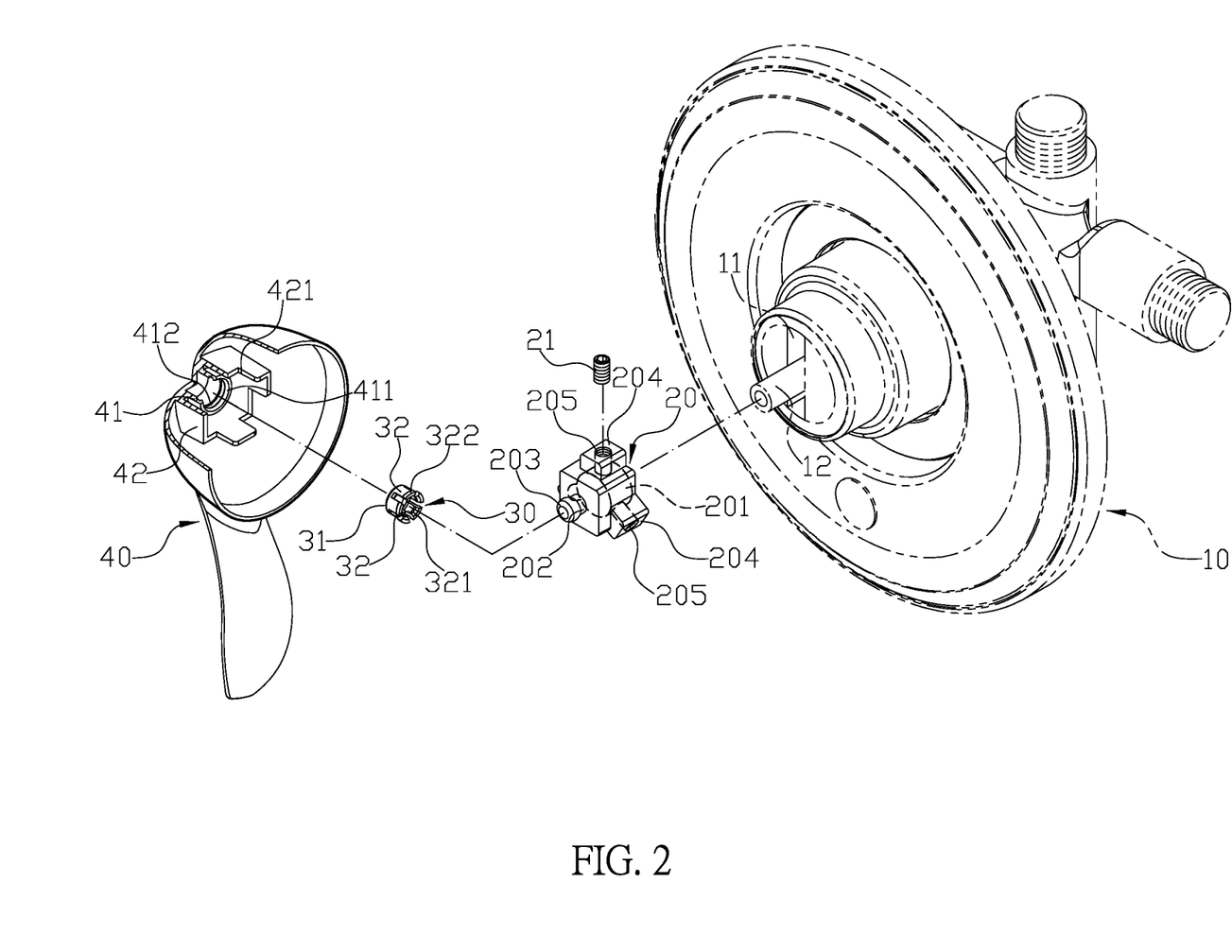
FIG. 2 is a three-dimensional exploded view of the faucet apparatus of the present invention.
Figure 3:
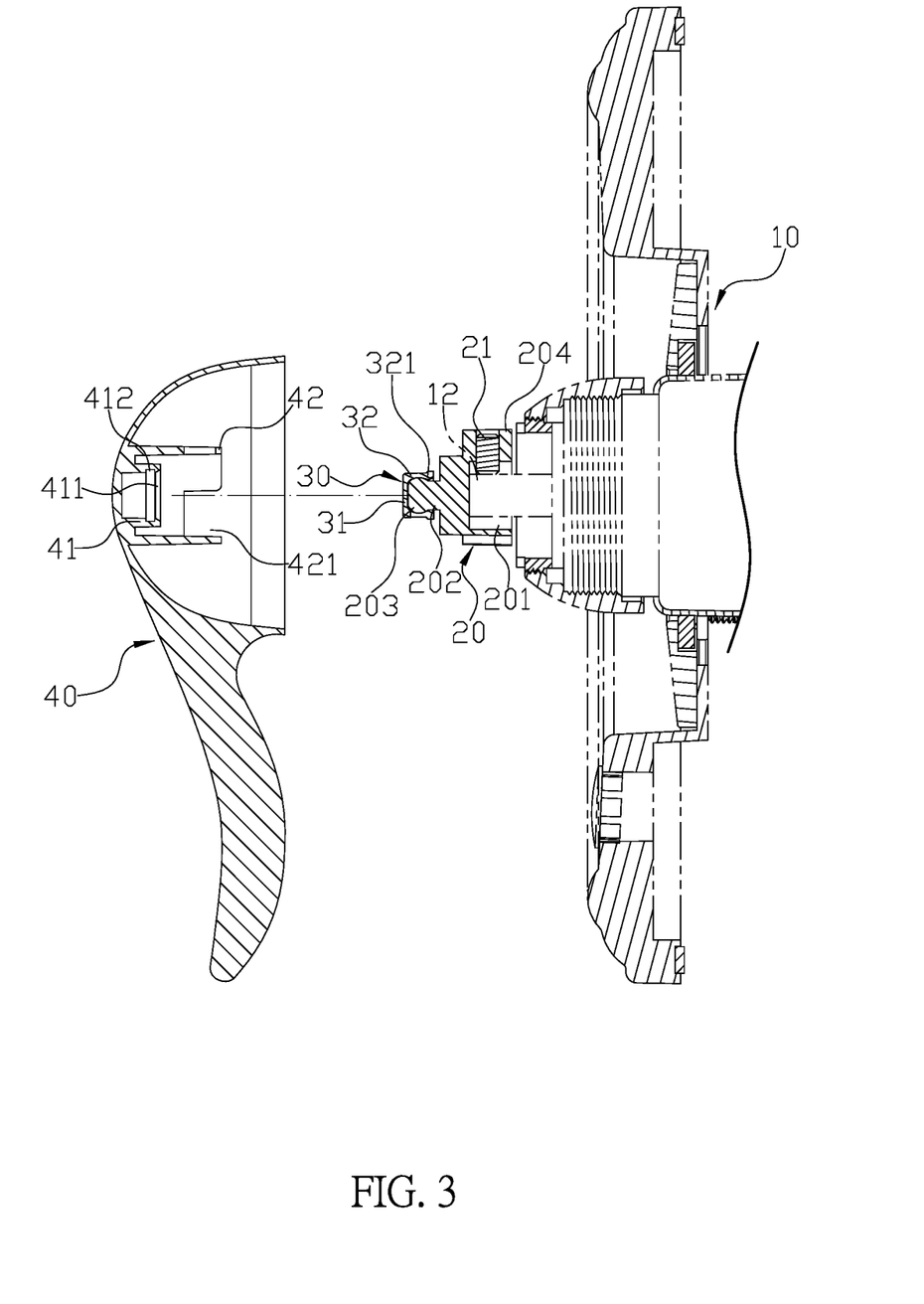
FIG. 3 is a schematic sectional view illustrating a connecting piece and a locating member are connected to a valve rod of the faucet apparatus in the present invention.
Figure 4:
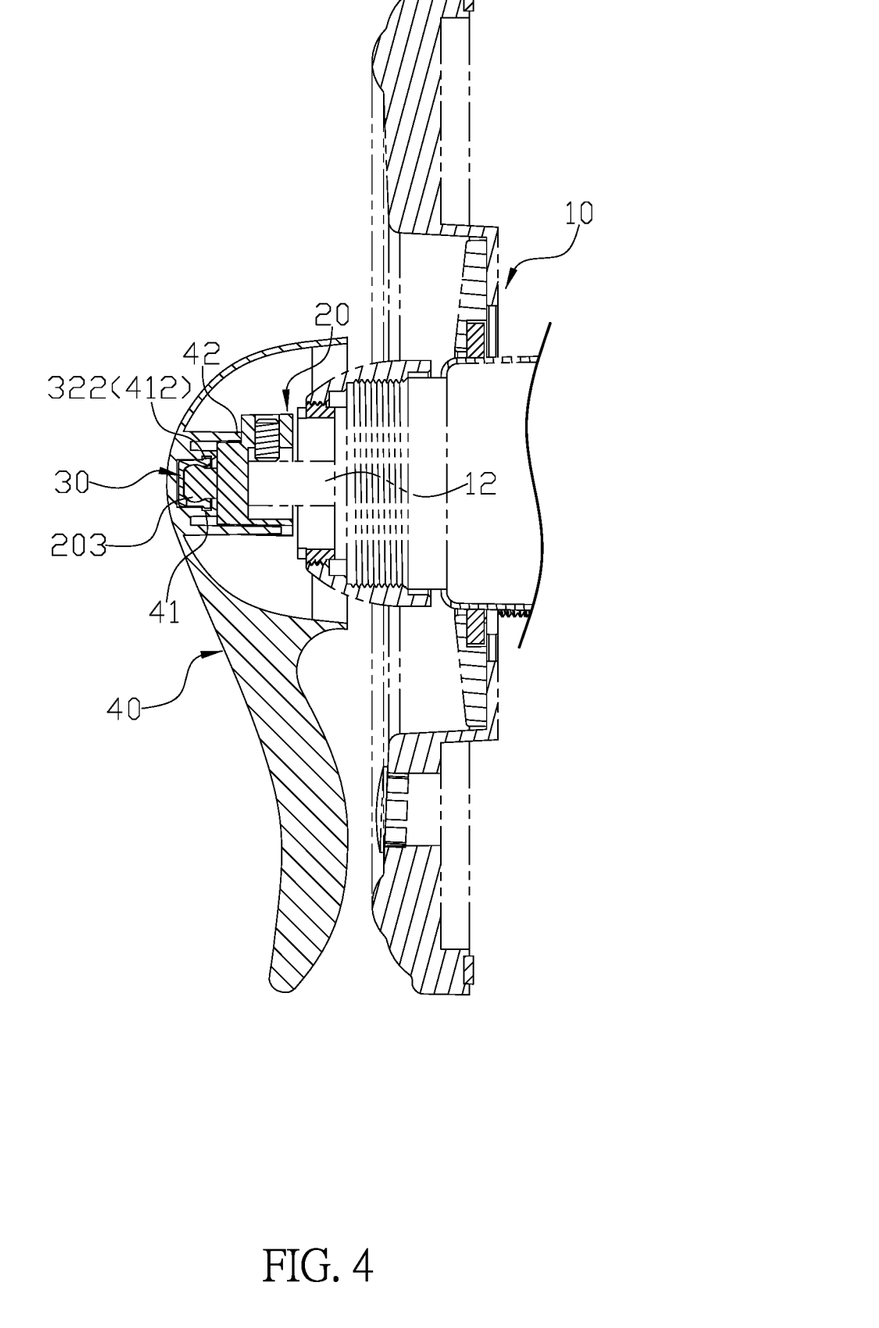
FIG. 4 is a sectional view illustrating a handle is connected to a faucet of the faucet apparatus in the present invention.
Figure 5:
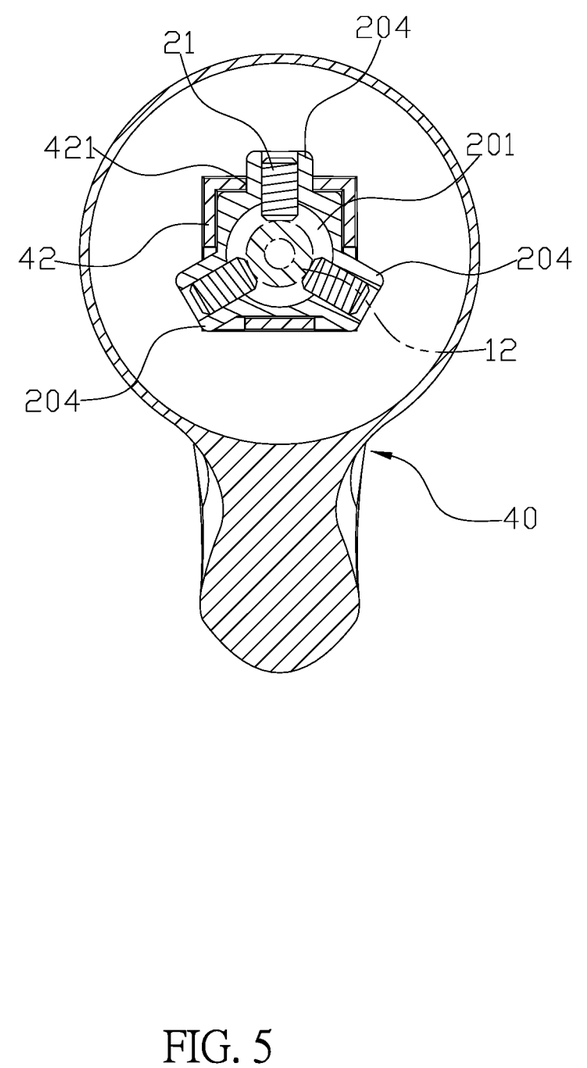
FIG. 5 is a sectional view from another angle illustrating the handle is connected to the faucet of the faucet apparatus in the present invention.
Figure 6:
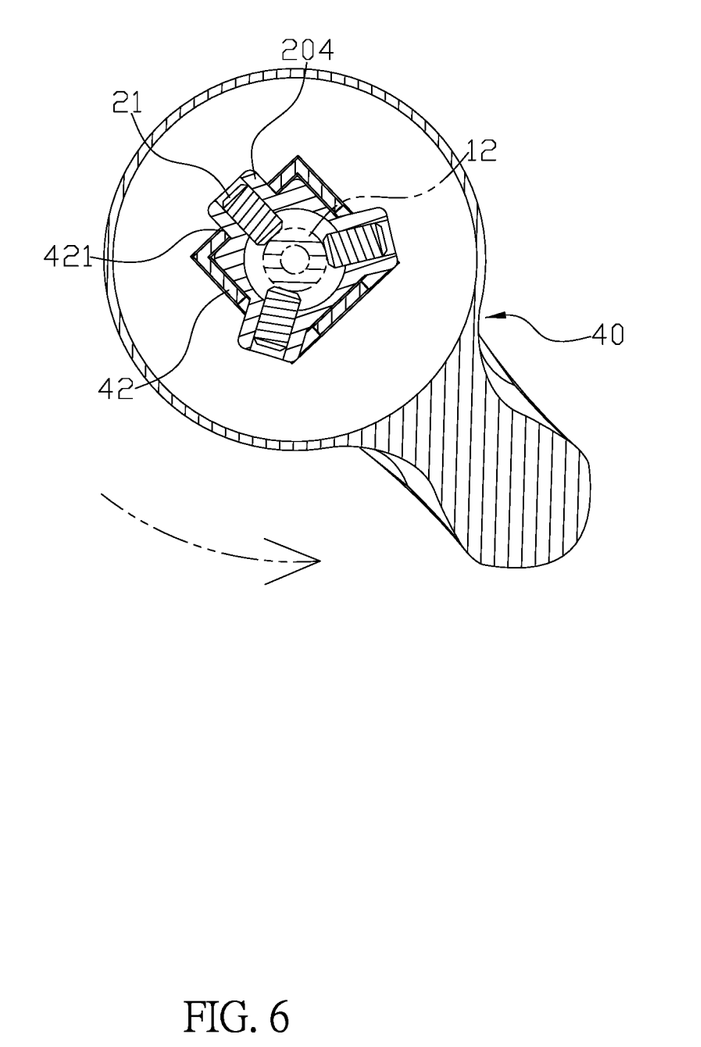
FIG. 6 is a schematic view illustrating the faucet apparatus of the present invention is in use.

In actual application, the screws (21) are screwed to abut against the valve rod (12), and the protruding portions (204) are engaged with the notches (421), so that when the handle (40) is rotated, the connecting piece (20) is configured to drive the valve rod (12) to have synchronous rotation (as shown in FIG. 6) so as to control the on/off operation of the faucet (10).

Comparing with conventional faucet apparatus, the present invention is advantageous because: (i) the housing (201) is disposed on the valve rod (12), and the screws (21) are screwed to abut against the valve rod (12), so that the handle (40) can be installed without limitation to the shape or size of the valve rod (12); (ii) the screws (21) are screwed in an open space, which reduces the difficulty of installation and saves the labor and time; and (iii) there is no need to reserve through holes on the handle (40) for the screws (21), which is better-looking and attractive for consumer.

Having described the invention by the description and illustrations above, it should be understood that these are exemplary of the invention and are not to be considered as limiting. Accordingly, the invention is not to be considered as limited by the foregoing description, but includes any equivalents.

What is claimed is:

1. A faucet apparatus comprising a faucet, a connecting piece, a locating member, and a handle;
   wherein the faucet has a valve chamber formed therein, and a control valve is installed in the valve chamber, and the control valve comprises a valve rod protruding out from the valve chamber;

wherein the connecting piece is concaved to form a housing on the end thereof, and the diameter of the housing is larger than the valve rod, and the other end of the connecting piece comprises a neck portion to connect to a locating head, and the diameter of the locating head is gradually larger from the neck portion to the end away from the neck portion; the difference in the diameter between the locating head and the neck portion is utilized to connect the locating member thereon, and a plurality of protruding portions are formed on the outer periphery of the connecting piece, and each of the protruding portions comprises a screw hole thereon to communicate with the housing; the connecting piece is connected to the valve rod through the housing, and a plurality of screws are configured to respectively screw into the screw holes to abut against the valve rod, so that the connecting piece and the valve rod are firmly connected through the locking force of the screws;

wherein the locating member has a disk body, and a plurality of claws are formed on the outer periphery of one end of the disk body; each of the claws comprises an inner claw portion and an outer claw portion at the end of the claw far from the disk body, and the claws are located separately to enable the claws to have elasticity of actively returning after external expansion; the locating member is disposed on the locating head by the elasticity thereof, and the inner claw portions are adapted to clasp on the locating head; and wherein the handle comprises a first edge and a second edge, and the first edge is formed inside the second edge, and an opening is formed at the end of the first edge, and the inner wall of the first edge has an engaging groove located adjacent to the opening; the second edge comprises a plurality of notches, and the number and the positions of the notches are formed corresponding to the protruding portions; the notches are configured to receive and engage with the protruding portions, and the handle is adapted to cover and connect to the outer side of the connecting piece; the locating member disposed on the locating head is pressed into the interior space of the first edge from the opening, and the outer claw portions are engaged with the engaging groove, so that the handle is firmed installed on the faucet.

2. The faucet apparatus of claim 1, wherein the faucet is a wall mounted faucet.

3. The faucet apparatus of claim 1, wherein the faucet is a desk mounted faucet.

4. The faucet apparatus of claim 1, wherein the locating head is formed in spherical shape.

5. The faucet apparatus of claim 1, wherein the connecting piece has three protruding portions thereon.

6. The faucet apparatus of claim 1, wherein the connecting piece comprises three protruding portions thereon, and one protruding portion vertically protrudes from the top of the connecting piece, and the other two protruding portions respectively protrude from two lateral sides of the connecting piece and are extended slope-down.

7. The faucet apparatus of claim 1, wherein the outer claw portion is formed in hook shape.

8. The faucet apparatus of claim 1, wherein the opening of the first edge is arranged in the shape of an outward expanding bevel to facilitate the locating member to be forced into the first edge through the opening.

* * * * *